(12) United States Patent
Amano et al.

(10) Patent No.: US 7,046,986 B2
(45) Date of Patent: May 16, 2006

(54) EMERGENCY COMMUNICATION SYSTEM (75) Inventors: Kiyoshi Amano, Machida (JP);
Takayuki Morimura, Tokyo (JP)

(73) Assignee: Image Partner, Inc., Tokyo (JP)

( * ) Notice: Subject to any disclaimer, the term of this patent is extended or adjusted under 35 U.S.C. 154(b) by 182 days.

(21) Appl. No.: 10/753,935

(22) Filed: Jan. 6, 2004

(65) Prior Publication Data
US 2005/0148317 A1 Jul. 7, 2005

(51) Int. Cl.
*H04M 11/04* (2006.01)
(52) U.S. Cl. .............. 455/404.1; 455/412.1; 455/403; 455/457; 379/37; 379/45; 379/46
(58) Field of Classification Search ............. 455/404.1, 455/403, 412.1, 457, 567, 41.2; 379/37, 379/45, 46
See application file for complete search history.

(56) References Cited

U.S. PATENT DOCUMENTS

2003/0054867 A1* 3/2003 Dowlat et al. .............. 455/567
2004/0203932 A1* 10/2004 Yamagishi et al. ......... 455/457
2005/0085189 A1* 4/2005 Hansen ...................... 455/41.2

* cited by examiner

*Primary Examiner*—Sonny Trinh
*Assistant Examiner*—Phuoc Doan
(74) *Attorney, Agent, or Firm*—Leighton K. Chong; Godbey Griffiths Reiss & Chong (57) ABSTRACT

An emergency communication system connected to a plurality of user communication terminals through public lines comprises a receiver and transmitter section for receiving information from a plurality of user communication terminals and for transmitting information to a plurality of user communication terminals, an ID memory section for storing ID of each user, an ID confirmation section for confirming user ID by reference to ID data stored in the ID memory section when information is received from the each user communication terminal and permitting receipt of the information from the user in case that the received ID is compatible with the stored ID, an information accumulation section for accumulating information received from user in case that the ID confirmation section permits receipt, and an information addressee registration section for registering at least one addressees to which the information accumulated in said information accumulation section is communicated through public lines.

6 Claims, 11 Drawing Sheets

① EMERGENCY CONNECTION

TELEPHONE (i-mode)

```
EMERGENCY
COMMUNICATION
─────────────────
    INFO. ADD.
            (1/1)
1. NAME
2. NAME
─────────────────
SELECTION OF
INFO. ADD.
1. MEMBER
2. GROUP
INPUT AND ALTER
OF MESSAGE
─────────────────
INFO. MESSAGE
OCCURRENCE OF
EMERGENCY
─────────────────
SAFETY CONFIRMATION
WHEN COMMUNICATING
[DON'T ▽]

INSTRUMENT
  ☐ MAIL
  ☐ OTHER MEDIA
     (PHONE ETC.)
─────────────────
  [START OF
   COMMUNICATION]

TO TOP MENU
```

(PC BROWSER)

| ITEM | CONTENTS |
|---|---|
| IND. INFO. ADD. | NAME/NAME |
| GR. INFO. ADD. | SALES DPE. |
| COMM. MEDIA | ☐ PHONE  ☐ CELL PHONE  ☐ PHS  ☐ BEEPER  ☐ FAX  ☐ MAIL |
| SAFETY CONFIRMATION WHEN COMMUNICATING | [DO ▽] |
| COMM. MESSAGE | OCCURRENCE OF EMERGENCY: PLEASE COME TO TEH OFFICE |

○ EMER. COMM.  [COMM. START] [IND. SEL.] [GR. SEL.]

FIG. 4

① EMERGENCY CONNECTION

TELEPHONE    (i-mode)

```
IND. INFO. RESULT
01/11/15 19:28
FROM---VILLAGE
INFO. STATUS    UNCOMFIRMED
VOICE
RESPONSE        NO
MEIL
RESPONSE        NO

1. CELL PHONE  19:43  4/4
2. MAIL               19:48  4/4

GO BACK
          TO SAFETY STATUS
          TO TOP MENU
```

(PC BROWSER)

○ COM. RESULT (BEFORE 24HOURS) UPDATE   ○ GO BACK

1/1

| ITEM | CONTENTS |
|---|---|
| RECEIPT ID | 0000001306 |
| COMM. DATE AND TIME | 2001/12/07 17:43 |
| COMMUNICATOR | ○+○ × |
| COMM. STATUS | COMM. COMPLETE |
| COMM. MESSAGTE | OCCURRENCE OF DISORDER. PLEASE CONTACT OFFICE URGENTLY |

| CONF. DATE AND TIME | INDI. ID | NAME | STATUS | CONF. | METHOD | NO. OF TIMES | VOICE RESPONSE | MAIL RESPONSE |
|---|---|---|---|---|---|---|---|---|
| 2001/12/07 17:43 | 030 | □○ △× | COMM. COMPLETE | CONF. | CELL PHONE | 1/1 | NO | NO |
| 2001/12/07 17:43 | 036 | □□ △○ | COMM. COMPLETE | CONF. | CELL PHONE | 1/1 | NO | NO |
| 2001/12/07 17:43 | 036 | □□ △○ | COMM. COMPLETE | | MAIL | 1/1 | NO | NO |

SAFETY CONFIRMATION ITEM

ORIGINAL INQUIRY ITEM AND AT MOST 10 RESPONSES CAN BE PREPARED

○ LIST OF SAFETY CONF. ITEM ○ NEW REG

| NO. | TITLE | GUIDANCE CONTENTS | ANSWER 1 | ANSWER 2 | ANSWER 3 |
|---|---|---|---|---|---|
| 1 | HOUSE | PLS. REPORT STATUS OF HOUSE DIAL 0, IF SAFE 1, IF PARTIAL DESTRUCTION, AND 2, IF DESTRUCTION | SAFE | PARTIAL | DESTRUCTION |
| 2 | FAMILY | PLS. REPORT STATUS OF FAMILY. DAIAL 0, IF ALL SAFE AND 1 IF INJURED PERSONS | ALL SAFE | INJURED PERSONS | |
| 3 | OFFICE | PLS. REPOET WHETHER COME TO THE OFFICE DIAL 0 IF POSSIBLE AND 1 IF IMPOSSIBLE | POSSIBLE | IMPOSSIBLE | WITHIN ONE HOUR |

SAFETY REGSTRATION METHOD

(1) REG BY PHONE (ACCESS BY MEMBER OWN)
DIAL SAFETY CONF. SYSTEM AND MAKE PUSH
OPERATION IN ACCORDANCE WITE GUIDANSE

(2) REG BY PHONE (WHEN RECEIVEING COMM.)
SAFETY CONFIRMATION SUBSEQUENT TO COMM. MAEK
PUSH OPERATION IN ACCORDANCE WITH GUIDANCE (3) REG FROM PC OR I-MODE
REG BY ACCESS FROM BROWSER

FIG. 8

②SAFETY CONFIRMATION

TELEPHONE (i-mode)

SAFETY REG.

NEW REG.
12/11 11:48
NEAM

MESSAGE

STATUS OF PERSON
[SAFE ▽]
STATUS OF FAMILY
[ALL SAFE ▽]
STATUS OF HOUSE
[SAFE ▽]
OFFICE
[POSSIBLE ▽]
RESERVATION OF FOOD
[ENOUGH ▽]

ESCAPE INFO. ADD.

[DECISION]

TO SAFETY STATUS

(PC BROWSER)

○ SAFETY REG. [REG.]

| ITEM | CONTENTS |
|---|---|
| REG. DATE AND TIME | 2001/12/07 17:43 |
| NAME | ○◇ □× |
| ESCAPE PHONE NO. | 03-XXX-XXXX |
| ESCAPE MAIL ADD. | △○×@○○○.co]p |
| MESSAGE | I AM SAFE. I COMETO TEH OEFICE WITHIN ONE HOUR. |

| SAFETY ITEM | STATUS |
|---|---|
| HOUSE | SAFE ▽ |
| FAMILY | ALL SAFE ▽ |
| OFFICE | WTYHIN ONE HOUR ▽ |

FIG. 9

TELEPHONE (i-mode)

SAFETY CONFIRMATION

SAFETY DETAIL

□O O△×
□□ 039
     2001/12/12 23:14
STATUS OF PERSON: INJURY
STATUS OF FAMILY: ALL SAFE
STATUS OF HOUSE: IMPOSSIBLE
STATUS OF OFFICE: IMPOSSIBLE
RESERVATION OF FOOD: ENOUGH

MESSAGE

ESCAPE INFO. ADD.
03-O△××-OOOO

GO BACK
                TO TOP MEUE (PC BROWSER)

○ SAFETY STATUS  [UPDATE]

○ [IND. ID ▽] [FWD ACCORD ▽] [     ] [SERACH]

| IND. ID | NAME | REG DATE AND TIME | ESCAPE PHONE NO. | ESCAPE MAIL ADD. | HOUSE | FAMILY | OFFICE |
|---|---|---|---|---|---|---|---|
| 039 | □O O△◇ | 2001-12-11 11:02 | 03-O△××-OOOO | OOOO@△×.cojp | SAFE | ALL SAFE | WITH IN ONE HOUR |
| 025 | OO□ △◇ | 2001-12-11 11:05 | 03-O△××-OO×× | O××O@△×.cojp | SAFE | INJURY | IMPOSSIBLE |
| 048 | □O O△ | 2001-12-06 10:02 | | | SAFE | INJURY | POSSIBLE |
| 007 | O□ O× | 2001-11-27 10:20 | | | PARTIAL DESTRUCTION | SAFE | ALL SAFE |
| 022 | OO | 2001-12-05 07:59 | | | | | |

① VOICE COMMUNICATION
(CALCULATION ON BASE OF 1 LINE OR 1COMM. PER 1 MIN.)

|  | 4 LINES (ANALOG) | 8 LINES (ANALOG) | 23 LINES (INS1500) |
|---|---|---|---|
| 10 PERSONS | 2.5 MIN. (0. 0HOUR) | 1.3 MIN. (0. 0HOUR) | 0.4 MIN. (0. 0HOUR) |
| 30 PERSONS | 7.5 MIN. (0. 1HOUR) | 3.8 MIN. (0. 1HOUR) | 1.3 MIN. (0. 0HOUR) |
| 50 PERSONS | 13 MIN. (0. 2HOUR) | 6 MIN. (0. 1HOUR) | 2 MIN. (0. 0HOUR) |
| 100 PERSONS | 25 MIN. (0. 4HOUR) | 13 MIN. (0. 2HOUR) | 4 MIN. (0. 1HOUR) |
| 150 PERSONS | 38 MIN. (0. 6HOUR) | 19 MIN. (0. 3HOUR) | 7 MIN. (0. 1HOUR) |
| 200 PERSONS | 50 MIN. (0. 8HOUR) | 25 MIN. (0. 4HOUR) | 9 MIN. (0. 1HOUR) |
| 400 PERSONS | 100 MIN. (1. 7HOUR) | 50 MIN. (0. 8HOUR) | 17 MIN. (0. 3HOUR) |
| 600 PERSONS | 150 MIN. (2. 5HOUR) | 75 MIN. (1. 3HOUR) | 26 MIN. (0. 4HOUR) |
| 800 PERSONS | 200 MIN. (3. 3HOUR) | 100 MIN. (1. 7HOUR) | 35 MIN. (0. 6HOUR) |
| 1000 PERSONS | 250 MIN. (4. 2HOUR) | 125 MIN. (2. 1HOUR) | 43 MIN. (0. 7HOUR) |
| 2000 PERSONS | 500 MIN. (8. 3HOUR) | 250 MIN. (4. 2HOUR) | 87 MIN. (1. 4HOUR) |
| 4000 PERSONS | 1000 MIN (16.7HOUR) | 500 MIN. (8. 3HOUR) | 174 MIN. (2. 9HOUR) |
| 6000 PERSONS | 1500 MIN (25.0HOUR) | 750 MIN. (12.5HOUR) | 261 MIN. (4. 3HOUR) |
| 8000 PERSONS | 2000 MIN (33.3HOUR) | 1000 MIN. (16.7HOUR) | 348 MIN. (5. 8HOUR) |
| 10000 PERSONS | 2500 MIN (41.7HOUR) | 1250 MIN. (20.8HOUR) | 435 MIN. (7. 2HOUR) |

② MAIL COMMUNICATION
(CALCULATION ON BASE OF 3 COMM. PER 1 SEC.)

|  | MAIL |
|---|---|
| 10 PERSONS | 3 SEC. (0. 1MIN.) |
| 30 PERSONS | 10 SEC. (0. 2MIN.) |
| 50 PERSONS | 17 SEC. (0. 3MIN.) |
| 100 PERSONS | 33 SEC. (0. 6MIN.) |
| 150 PERSONS | 50 SEC. (0. 8MIN.) |
| 200 PERSONS | 67 SEC. (1. 1MIN.) |
| 400 PERSONS | 133 SEC. (2. 2MIN.) |
| 600 PERSONS | 200 SEC. (3. 3MIN.) |
| 800 PERSONS | 267 SEC. (4. 4MIN.) |
| 1000 PERSONS | 333 SEC. (5. 6MIN.) |
| 2000 PERSONS | 667 SEC. (11. 1MIN.) |
| 4000 PERSONS | 1333 SEC. (22. 2MIN.) |
| 6000 PERSONS | 2000 SEC. (33. 3MIN.) |
| 8000 PERSONS | 2667 SEC. (44. 4MIN.) |
| 10000 PERSONS | 3333 SEC. (55. 6MIN.) |

EMERGENCY COMMUNICATION SYSTEM

BACKGOUND OF THE INVENTION

This invention relates to an emergency communication system, more particularly an emergency communication system which can transmit emergency information to many persons and register safety information from many persons when an emergency occurs.

When a disaster such as an earthquake and fire hazards, a large-scale accident, a terrorism and the like occurs, it is necessary to inform families, company members and concerned parties of the occurrence of the disaster, the accident, or the like urgently. Such a required communication is hereinafter referred to as an emergency communication. At the same time there are circumstances in which a safety of families, company members and concerned parties is required to confirm urgently. Such a confirmation is hereinafter referred to as a safety confirmation.

Conventionally, in case of emergency communication a system in which the first communicator calls several persons by phone and then each of the several persons receiving the first message calls another several persons by phone is carried out, or a system in which the message is communicated in sequence in accordance with the predetermined network is carried out. In these cases it takes a long time to communicate by phone because of sequential communication. Furthermore, it totally takes a very long time to complete communications to all persons required for communication since the persons called up can be busy on another phones or can be out. Furthermore, the person who informed initially is busy with phones and thus has to stay there which results in the delay of initial motion.

There are two cases in safety confirmation, the first being the case that family confirms the safety, and the second being the case that the damaged person informs his or her family of his or her damage. In both cases, the persons who want to confirm have to make many phone calls until the persons can get a telephone call since it is not easy to get through. As a result, it takes a long time to confirm the safety and for the time being the persons are always anxious about the safety of family.

In the meantime, recently, infrastructure of communication such as public telephone network, cell phone network, Internet network based on personal computer and the like, or Internet network based on the cell phone as represented by i-mode (registered trademark) has been established in many fields. It is desired that such an infrastructure of communication is used in a time of disaster.

SUMMARY OF THE INVENTION

It is therefore an object of the present invention to provide an emergency communication system which can make communications for sure and for a short time in both cases of emergency communication and safety confirmation.

To accomplish the object of the present invention there is provided an emergency communication system connected to a plurality of user communication terminals through public lines which comprises: a receiver and transmitter section for receiving information from a plurality of user communication terminals and for transmitting information to a plurality of user communication terminals, an ID memory section for storing ID of each user, an ID confirmation section for confirming user ID by reference to ID data stored in said ID memory section when information is received from the each user communication terminal and permitting receipt of the information from the user in case that the received ID is compatible with the stored ID, an information accumulation section for accumulating information received from user in case that said ID confirmation section permits receipt, and an information addressee registration section for registering at least one addressees to which the information accumulated in said information accumulation section is communicated through public lines, in which when said receiver and transmitter receives an emergency information from user communication terminals said information is accumulated in said information accumulation section and the information thus accumulated is transmitted all at once to the information addressees registered in said information addressee registration section.

According to the invention, firstly the receiver and transmitter section receives an emergency information from the user communication terminals. When receiving, the ID confirmation section checks received user ID in reference to the ID data stored in the ID confirmation section and then permits receipt of information in case that the received ID is compatible with ID data. After receipt, the information accumulation section accumulates the emergency information. The receiver and transmitter section all at once transmits the information accumulated in the information accumulation section to the information addressees registered in the information addressee registration section through the public lines.

Since the emergency information is all at once transmitted to the predetermined information addressees, the first communicator does not have to inform many persons of the same contents. Consequently, the first communicator can dedicate himself to initial motion. Since the time spent for communication is very short, the communication to information addressees are completed early and the receivers who receive the emergency information can deal with it.

The emergency communication system according to the present invention may include a conversion section for converting information of character signals accumulated in the information accumulation section to voice signals in case that information of character signals is received from user communication terminals.

According to the invention, since in case that the receiver and transmitter section receives information in character signals from the user communication terminals the conversion converts information of character signals into the voice signals, the voice information can be all at once transmitted to the information addressees.

With the emergency communication system according to the present invention, the information from the plurality of user communication terminals and the information to the plurality of user communication terminals may be a combination of at least voice, image or character.

According to the present invention, since the registration of safety confirmation item and the registration of safety response information to the safety confirmation system are composed of either one of voice, image and characters, the first communication is composed of either one of voice, image and characters, and the communication to registered information addressees is composed of either one of voice, image and characters. Therefore, the information from the plurality of user communication terminals or the information to the plurality of user communication terminals may be in combination of voice and image, image and characters, voice and characters, or voice, image and characters.

With the emergency communication system according to the present invention, since the objects of communication are received and transmitted in a variety of forms, more accurate information can be communicated to many persons by including the photographs on disaster site in the information when informing of the disaster.

There is also provided an emergency communication system connected to a plurality of user communication terminals through public lines which comprises: a receiver and transmitter section for receiving information from a plurality of user communication terminals and for transmitting information to a plurality of user communication terminals, an ID memory section for storing ID of each user, an ID confirmation section for confirming user ID by reference to ID data stored in said ID memory section when information is received from the each user communication terminal and permitting receipt of the information from the user in case that the received ID is compatible with the stored ID, a safety confirmation item registration section for accumulating information of safety confirmation item received from user communication terminals in case that said ID confirmation section permits receipt, and a safety response information registration section for registering the safety response information when said ID confirmation section permits receipt of the safety response information in said safety confirmation item from user communication terminals which received the safety conformation information including said safety confirmation item, in which in case that an enquiry information is received from the communication terminal of user who wants to obtain the safety response information registered in said safety response information registration section, on condition that the user ID is compatible, said enquiry information is registered in said safety response information registration section and the safety response information corresponding to said enquiry information is provided to user communication terminal.

According to the invention, firstly the receiver and transmitter section receives information of safety confirmation item from the user communication terminals. When receiving, the ID confirmation section checks the received user ID in reference to the ID data stored in the ID confirmation section and then permits receipt of information in case that the received ID is compatible with ID data. After receipt, the safety confirmation item registration section registers information of the safety confirmation item received from the user communication terminal. The receiver and transmitter section transmits safety confirmation information including the safety confirmation item to the user communication terminal. The receiver and transmitter section receives the safety response information to the safety confirmation information from the user communication terminal when the ID confirmation section permits its receipt. The safety response information registration section registers the received safety response information. In case that the user wants to obtain the safety response information registered in the safety response information registration section the user transmits enquiry information from the communication terminal to the receiver and transmitter section. On condition that the user ID is compatible or acceptable the receiver and transmitter section receives the enquiry information. The receiver and transmitter section provides the user communication terminal with the information registered in the safety response information registration section, corresponding to the enquiry information.

With the emergency communication system according to the present invention, the user who receives the safety confirmation information can register his safety as safety response information in the safety response information registration section at his convenience. In the meantime, the person who wants to obtain the safety response can access the emergency communication system at his convenience to obtain the necessary information in the safety response information.

The emergency communication system according to the present invention may include a statistical data creation section for creating statistical data from the safety response information.

According to the present invention, the statistical data creation section can create statistical data from the safety response information registered in the safety response information registration section.

With the emergency communication system, whole personal and impersonal damages can be grasped rapidly.

According to the present invention, the information from said plurality of user communication terminals and the information to said plurality of user communication terminals are a combination of at least voice, image or character.

With the emergency communication system according to the present invention, since the objects of communication are received and transmitted in a variety of forms, more accurate information can be communicated to many persons by including the photographs on disaster site in the information when informing of the disaster.

Other objects and aspects of the invention will become apparent from the following description of the embodiment with reference to the accompanying drawings in which:

FIG. 11 is a list showing the time required to communicate with regard to voice messages and mail messages in case that the messages are communicated all at once using an emergency communication system.

DESCRIPTION OF THE PREFERRED EMBODIMENT

The present invention will be explained with reference to the drawing.

The emergency communication system according to the present invention comprises (1) an emergency connection system, (2) a safety confirmation system and (3) a family safety message system.

Figure 1:
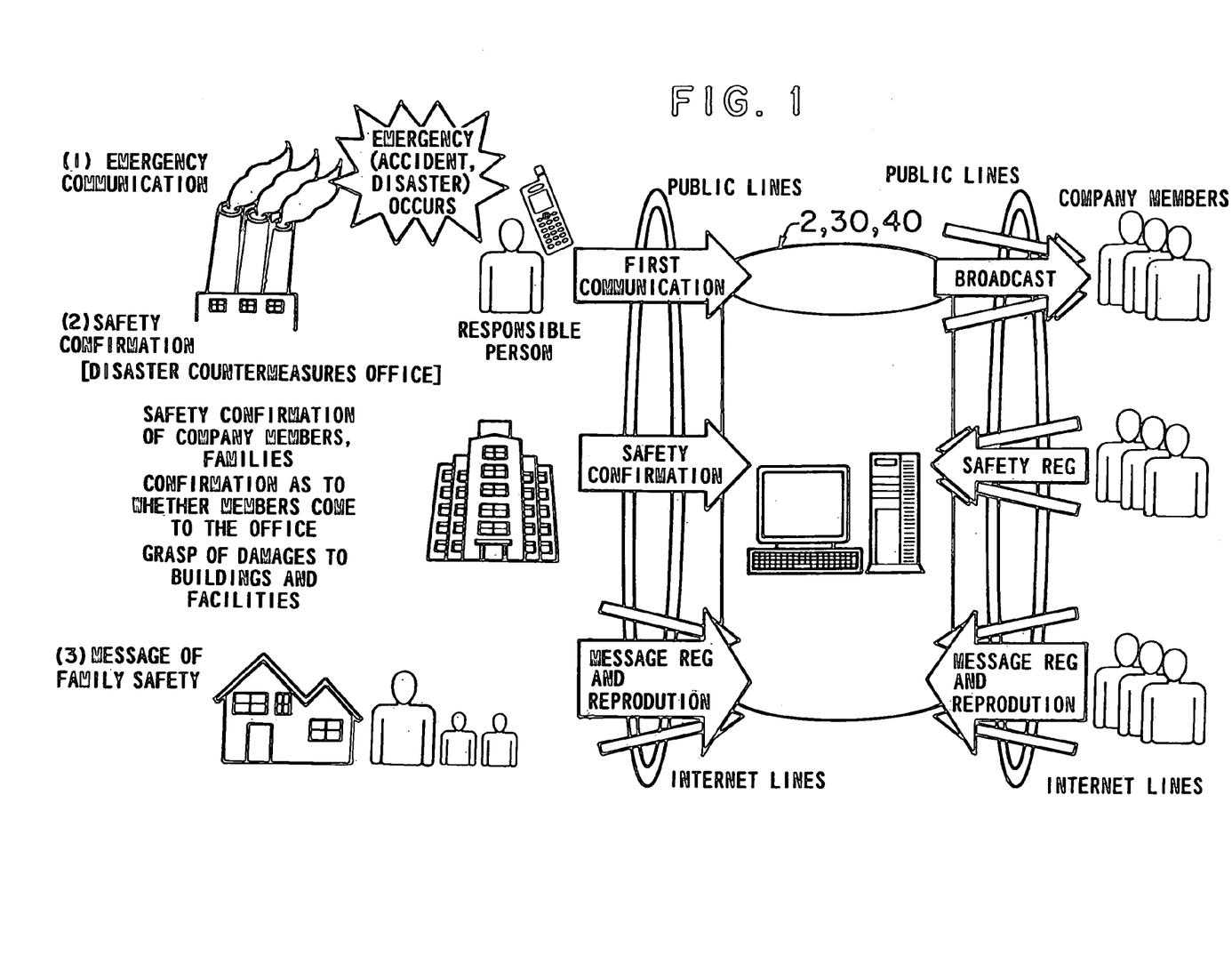
FIG. 1 is a schematic diagram of a whole emergency communication system including an emergency connection system, a safety confirmation system and a family safety message system.

FIG. 1 is a schematic diagram of whole emergency communication system including the above-mentioned three systems.

With the emergency connection system, the first communicator all at once communicates to many persons, for example, company members promptly using the emergency connection system when an emergency such as an accident or a disaster occurs.

With the safety confirmation system, when the disaster countermeasures office wants to confirm safeties of company members, families or the like, to confirm whether company members come to the office, or to grasp the damage of buildings or facilities in case that an accident or a disaster occurs, safety confirmation information is inputted to the safety confirmation system, the company members or families send their own safety information to the safety confirmation system before safety confirmation information reaches the safety confirmation system. In other words, as the persons who want to obtain the safety information access the safety confirmation system, the safeties of company members or families can be confirmed.

With the family safety message system, when an emergency such as an accident or a disaster occurs, persons in the disaster area register their own safeties in the family safety message system, information about safety enquiry from the company members or their families is registered in the family safety message system, or safety information about persons in the disaster area is reproduced by the family safety message system.

Figure 2:
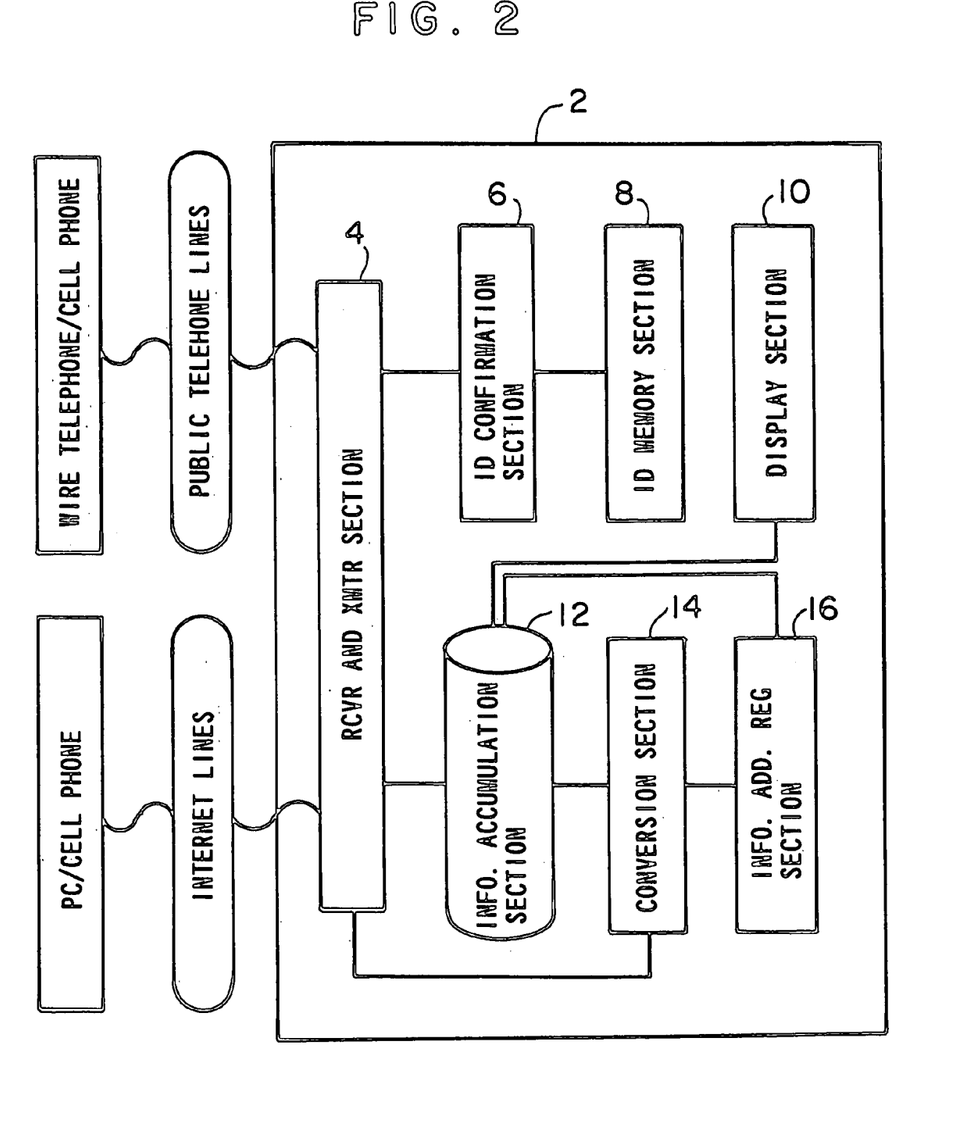
FIG. 2 is a block diagram showing the construction of the emergency communication system.

Firstly the emergency connection system will be explained in detail. FIG. 2 is a block diagram showing the construction of the emergency connection system 2. The emergency connection system 2 serves as a server which is connected to user wire telephones and cell phones through public telephone lines and connected to user personal computers and cell phones through Internet lines. The emergency connection system 2 comprises a receiver and transmitter section 4, an ID confirmation section 6, an ID memory section 8, a display section 10, an information accumulation section 12, a conversion section 14, and an information addressee registration section 16.

The receiver and transmitter section 4 is connected to outside public telephone lines and Internet lines and serves as contacts between reception and transmission of information. The information includes voice, characters, image or the like. The ID confirmation section 6 confirms IDs of senders and receivers and checks them against ID data stored in the ID memory section 8 to permit the reception and transmission when information is received or transmitted.

The information accumulation section 12 stores the information received by the receiver and transmitter section 4.

The stored information can be displayed on the display section 10 when it is wanted to see on the browser of the server.

The conversion section 14 serves to convert information on voice, characters, images or others stored in various modes into another modes and the information thus converted can be transmitted by the receiver and transmitter section 4.

The information addressee registration section 16 registers the information addressees which should be communicated all at once. The information stored in the information accumulation section 12 is transmitted to the information addressees registered in the information addressee registration section 16 from the receiver and transmitter section 4. The information converted into another mode by the conversion section 14 also can be transmitted to the information addressee registered in the information addressee registration section 16.

Figure 10:
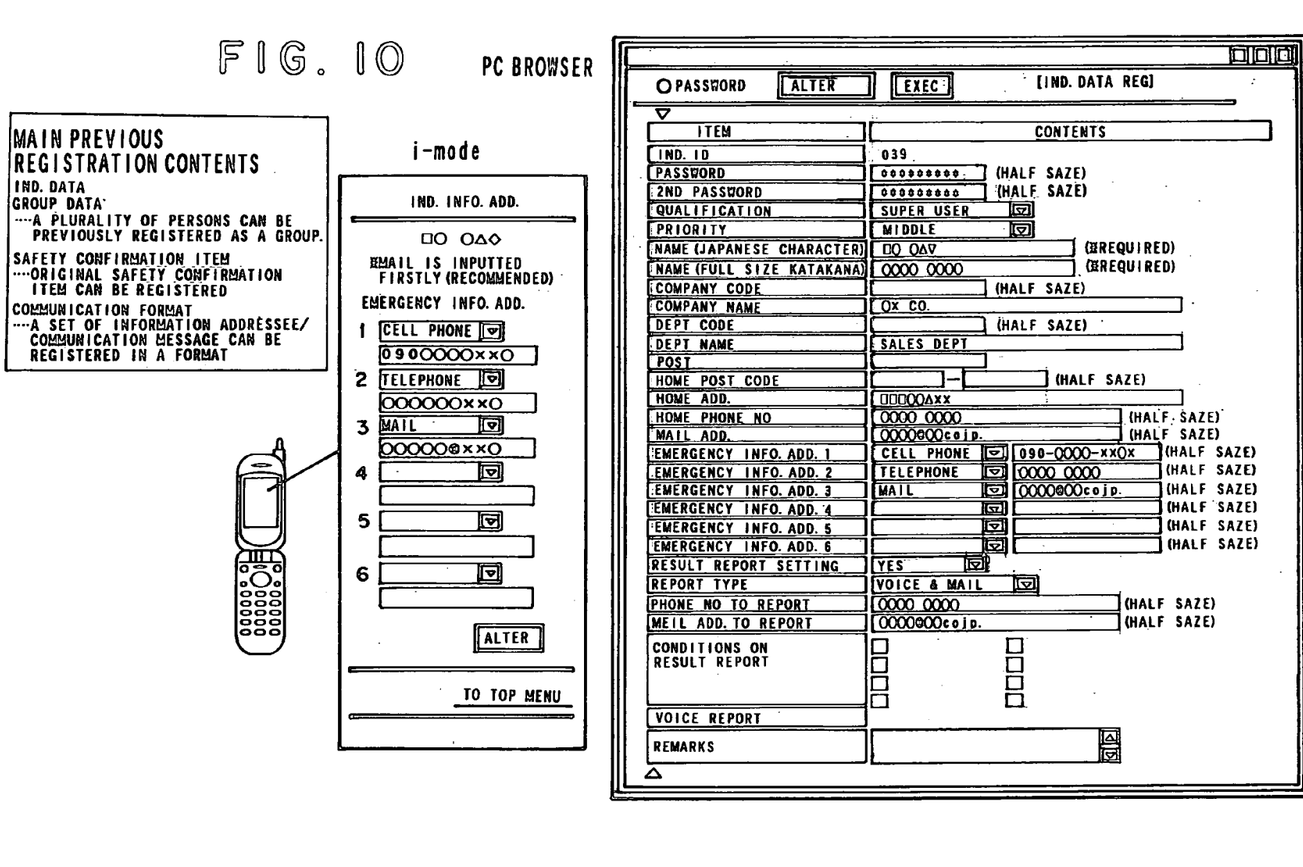
FIG. 10 shows an example of contents of registered individual data shown by a user computer browser, and an image plane of cell phone inputted from the cell phone.

On the condition that communication is carried out all at once when an emergency such as an accident, a disaster, or the like occurs, individual data and group data of information addressees are registered previously. FIG. 10 shows an example of contents registered as individual data displayed on the browser of personal computer and the image plane of the cell phone inputted from the cell phone. The individual data includes an individual ID, a password, name, company name, home address, home phone number, mail address, 6 emergency information addressees in order of priority, setting of result report, report type, phone number of the person which receives the report, mail address of the person which receives the report conditions of result report or the like. A plurality of addresses such as branch offices can be registered in addition to the home address. 6 emergency information addressees can be inputted from the cell phone. A plurality of persons can be registered as information addressees in a group. In the case, a group ID can be set. Furthermore, a safety confirmation item can be registered as information which is transmitted all at once. The control of these data can be uploaded or downloaded in file of CSV format.

An actual communication using emergency connection system 2 will be explained with reference to FIGS. 3 to 5.

Message media includes (1) voice by general telephone or PHS or Personal Handyphone System and (2) E-mail by communication terminals provided with mail function such as personal computer or cell phone with i-mode.

Firstly the person in charge in job site who encounters an accident or a disaster communicates to the emergency connection system 2 with voice by phone, mail by cell phone or mail by personal computer.

Figure 5:
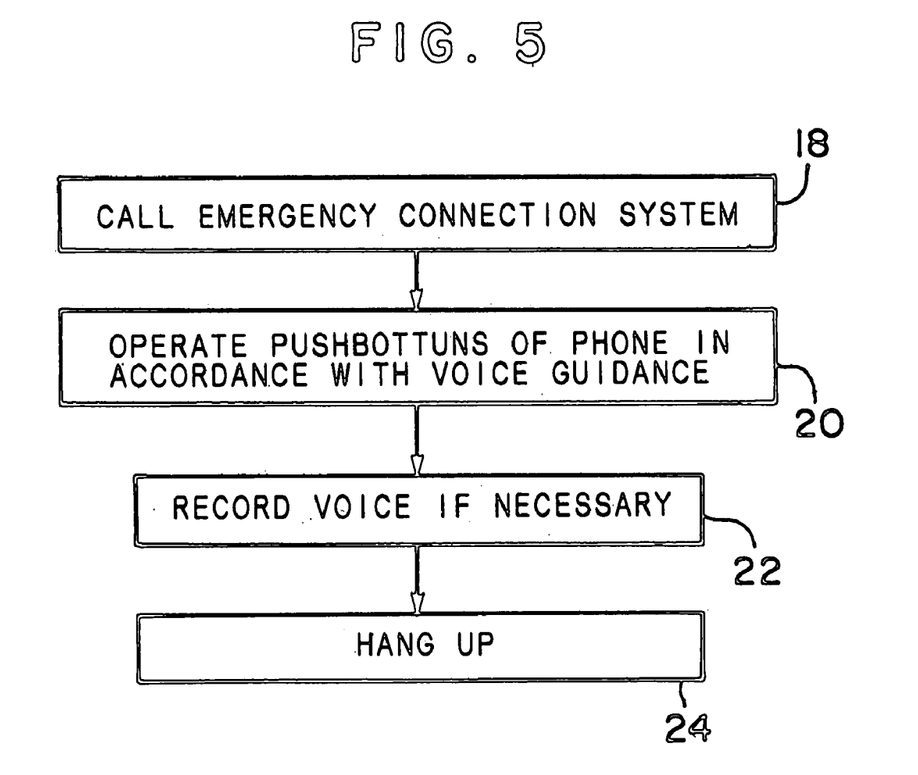
FIG. 5 is a flowchart showing procedures when an emergency information is communicated to an emergency connection system with a voice by phone.

FIG. 5 is a flowchart showing procedures when an emergency information is communicated to the emergency connection system 2 with voice by phone. When the voice by the emergency phone are used, firstly the emergency connection system 2 is called up (Step 18). Next the push buttons on the phone are operated in accordance with voice guidance generated by the receiver and transmitter section 4 (Step 20). At that time, user inputs his own individual ID, and individual IDs or group ID of information addressees. The user records emergency information or the like by voice if necessary (Step 22). Thereafter, he hangs up the phone (Step 24). By the communication by voice, voice file is generated in the emergency connection system 2 based on key of ID.

Figure 3:
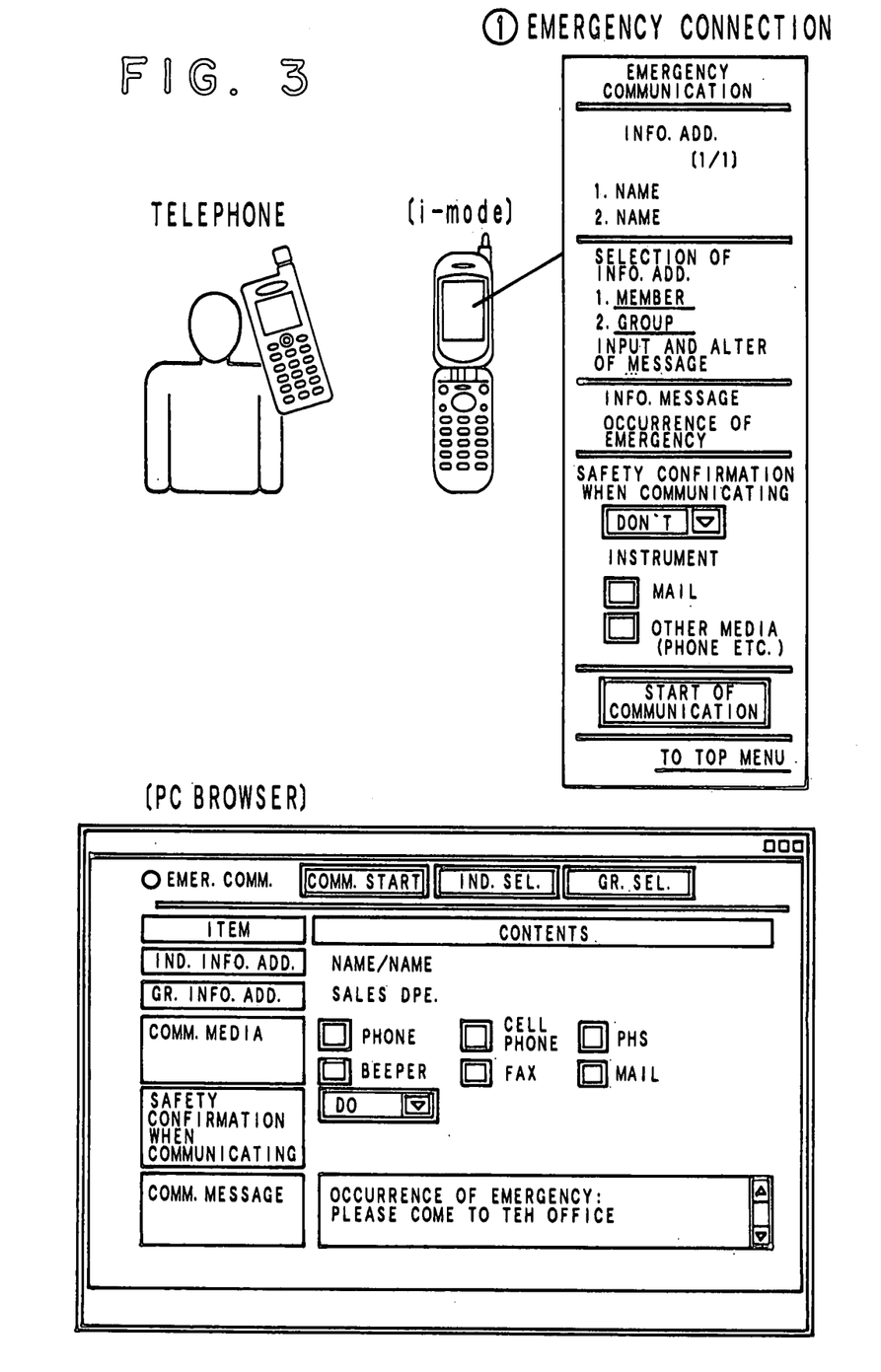
FIG. 3 shows an image plane of cell phone in case that an emergency information is communicated to the emergency connection system by the cell phone provided with mail function, and a personal computer browser in case that an emergency information is communicated to the emergency connection system by user personal computer.

FIG. 3 shows the image plane of the cell phone when an emergency information is communicated by the cell phone with mail function and the personal computer browser when an emergency information is communicated to the emergency connection system 2 by user personal computer.

In case of communication by the cell phone provided with mail function, the individual information addressees, and member information addressees or group information addressees are inputted or selected to input or change the message of emergency communication. The safety confirmation requirement is inputted and then if contents of communication are decided communication start button is pushed.

In case of communication by personal computer, the individual selection button or group selection button is pushed and the individual information addressees or group information addressees are inputted in accordance therewith, and the safety confirmation requirement is inputted and then if contents of communication are decided communication start button is clicked.

When communicated, files based on the keys of company member IDs or affiliation numbers are generated common to voice, cell phones provided with mail function and personal computers. After communications to the emergency connection system 2 start, communications to designated information addressees are commenced common to voice, cell phones provided with mail function and personal computers, and communications are retried until the receivers return communication confirmations.

Furthermore, the media which are used for receiving communications can be a beeper or a facsimile in addition to general phone, cell phone, PHS, communication terminal with mail function.

Since the phone number of the emergency connection system 2 is displayed on the beeper in case that voice communications are received by the beeper, the person who receives communication calls up to confirm unconfirmed message.

Since the phone number of the emergency connection system 2 is displayed on the beeper in case that character communications are received by the beeper, the person who receives communication calls up to confirm unconfirmed message. At that time, the message is read aloud in a robot voice.

In case that character communication is transmitted from the emergency connection system 2 to the beeper, previously registered characters can be transmitted using exclusive broadcast function of the beeper.

In case that the voice communication is received by FAX, the contents "there is a message. Please call the emergency connection system to confirm the message" is transmitted. The person who receives the FAX calls the emergency connection system 2 to confirm the unconfirmed message to him or her.

In case that the character communication is received by FAX, the communication message is outputted from the FAX. The person who receives the communication calls the emergency connection system to confirm the unconfirmed message to him or her. At that time, the message is read aloud in a robot voice.

In case that image information such as picture or photograph is transmitted from the emergency connection system 2 to the FAX, previously registered contents can be transmitted using formulaic communication function.

The person who receives communication carries out the operation of transmission of message, safety registration, message confirmation and the like by the general phone, the cell phone, PHS, and the communication terminal.

Now, how the communication result is obtained from the emergency connection system 2 after the broadcast will be explained.

The communication in case that the broadcast is made by phones is confirmed depending on whether the broadcast reaches to the information addressees and is formally received.

Figure 4:
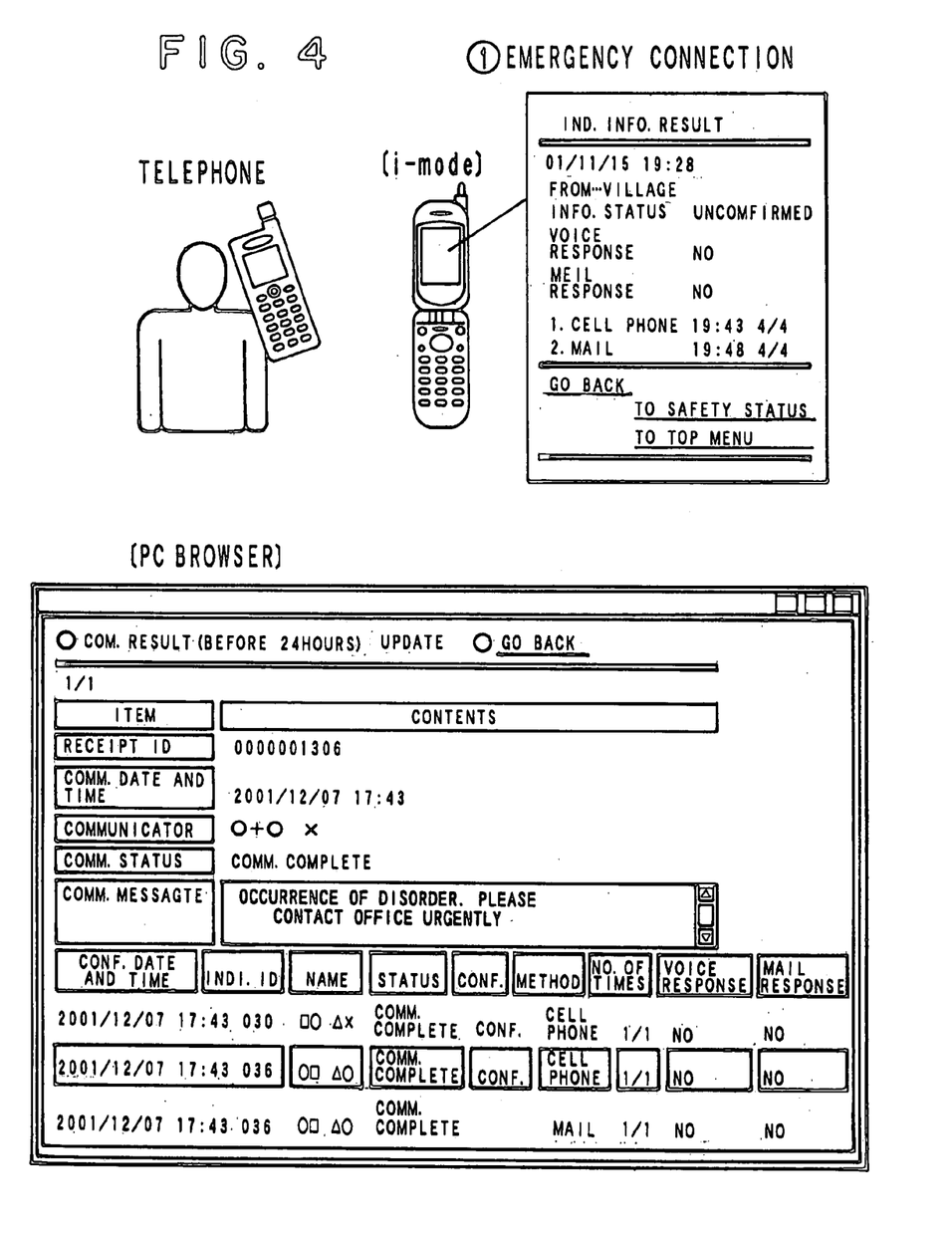
FIG. 4 shows an image plane of cell phone showing the result of message confirmation in case that an emergency information is communicated to the emergency connection system by the cell phone provided with mail function, a personal computer browser showing the result of message confirmation in case that an emergency information is communicated to the emergency connection system by user personal computer.

FIG. 4 shows an image plane of cell phone showing the result of message confirmation in case that an emergency information is communicated to the emergency connection system 2 by the cell phone provided with mail function, a personal computer browser showing the result of message confirmation in case that an emergency information is communicated to the emergency connection system by user personal computer.

On the image plane of the cell phone provided with mail function, the status as to whether the communicated massage is received and confirmed at the information addressee is shown.

On the personal computer browser, the information addressee and the confirmation as to whether the communication is completed for each information addressee and received at each information addressee are displayed.

In case of the cell phone with mail function and the personal computer the message status is displayed on the browser in real time. The input of ID is required of each of voice, cell phone provided with mail function and personal computer to obtain the above-mentioned message confirmation. In each case, the communication status message can be received 40 seconds after the end of communication.

FIG. 11 is a list showing the time required to communicate with regard to voice messages and mail messages in case that the messages are communicated all at once using an emergency communication system. In case of voice message, the broadcast can be made 25 minutes by analog 4 lines for 100 persons. In case of 23 lines using INS1500 available from NTT EAST ("INS": registered trademark) the broadcast can be made 4 minutes. In case that the cell phone provided with mail function or personal computer is utilized, the broadcast for 100 persons can be completed 33 seconds.

Furthermore, in case that the first message to the emergency connection system 2 is a voice message, the voice message is stored in the information accumulation section 12 and in case that the information addressees are mail communication terminals or FAX and the like, in sending, the content "There is a voice message" is written on the document of the FAX or the like.

In case that the first message is character information, the character data is converted into a robot voice at the "text to speech" of the conversion section 14 and can be broadcast or communicated all at once in voice signals. Since there is an application provided through firmware on voice processing board in the emergency connection system 2, the conversion between the voice and characters or images can be made.

Furthermore, the first message may be either one of voice, image and characters and the broadcast may be either one of voice, image and characters. Therefore, the information from the plurality of user communication terminals or the information to the plurality of user communication terminals may be in combination of voice and image, image and characters, voice and characters, or voice, image and characters. The image can be made to correspond to JPEG or GIF.

Figure 6:
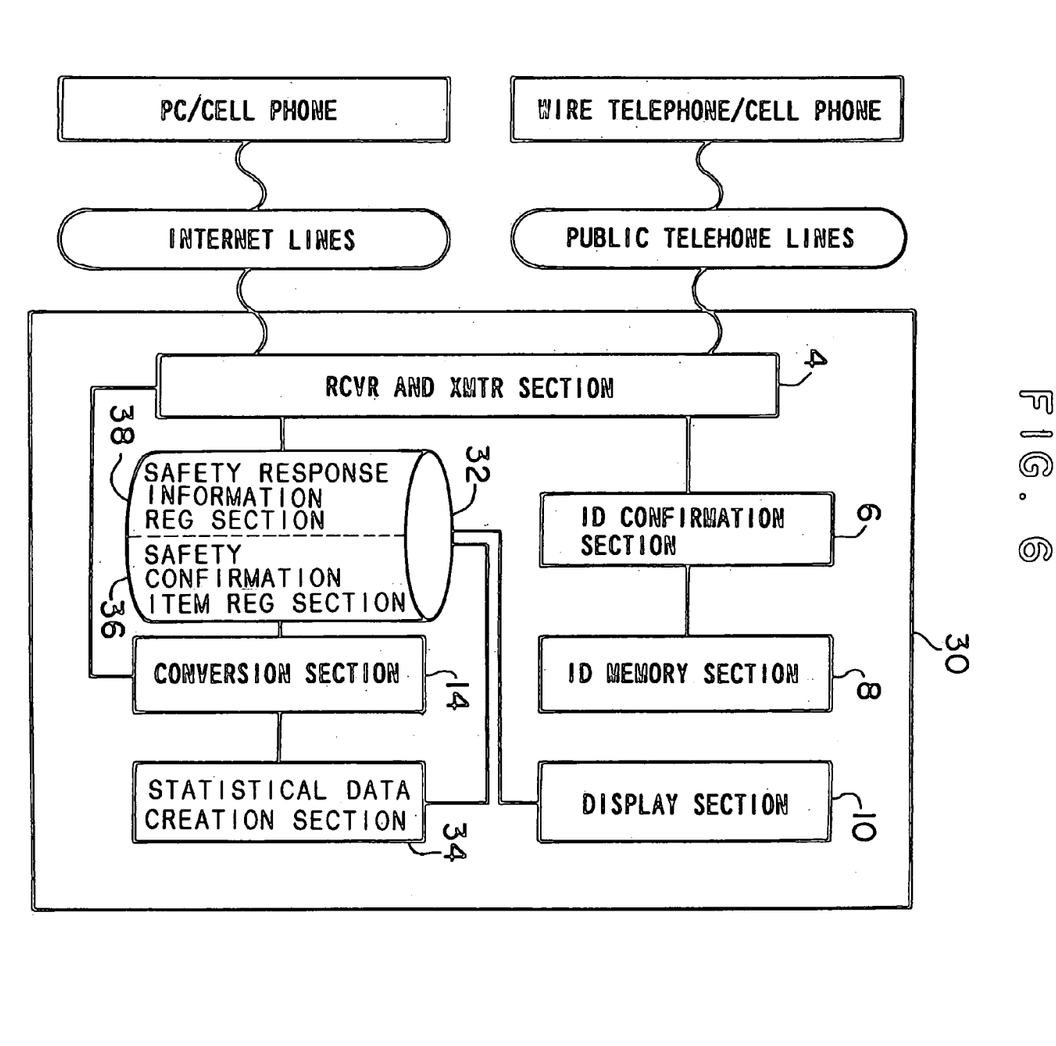
FIG. 6 is a block diagram showing the construction of a safety confirmation system.

Now, the safety confirmation system will be explained in detail. The safety confirmation system 30 is fundamentally similar to that of the emergency connection system 2 except the contents described below. FIG. 6 is a block diagram showing the construction of the safety confirmation system 30. The safety confirmation system 30 also serves as a server which is connected to user telephones and cell phones through public telephone lines and connected to user personal computers and cell phones through Internet lines. The safety confirmation system 30 comprises a receiver and transmitter section 4, an ID confirmation section 6, an ID memory section 8, a display section 10, a safety information accumulation section 32, a conversion section 14, and a statistical data creation section 34.

The receiver and transmitter section 4 is connected to outside public telephone lines and Internet lines and serves as contacts between reception and transmission of information. The information includes voice, characters, image or the like. The ID confirmation section 6 confirms IDs of senders and receivers and checks them against ID data stored in the ID memory section 8 to permit the reception and transmission when information is received or transmitted.

The safety information accumulation section 32 comprises a safety confirmation item registration section 36 and a safety response information registration section 38. When the item in which a safety is required to confirm is transmitted from the general phones or cell phones, the safety confirmation item registration section 36 registers the item. When safety response information is transmitted from company members or families after the safety confirmation item is transmitted to company members or families, the safety response information registration section 38 registers the safety response information. The safety response information can be registered before the safety confirmation item is transmitted to company members or families. When the company members or families desire to see the accumulated safety information on the browser of the server, it can be displayed on the display section 10.

The conversion section 14 serves to convert information on voice, characters, images or others stored in various modes into another modes and the information thus converted can be transmitted by the receiver and transmitter section 4.

The statistical data creation section 34 can create statistical data from the safety response information accumulated in the safety response information registration section 38. The statistical data serves for grasping the damages.

Figure 7:
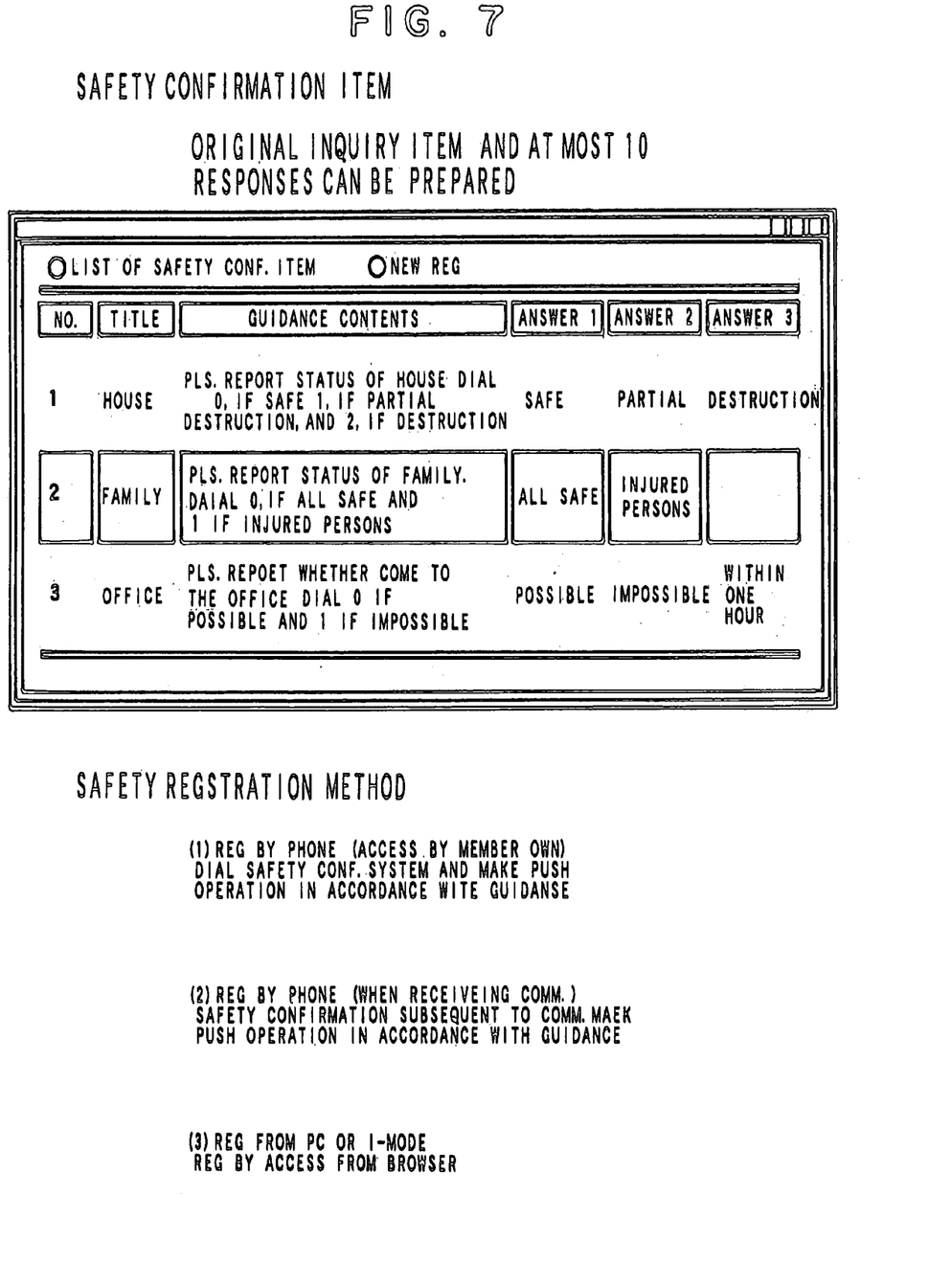
FIG. 7 shows an example of item of safety confirmation and a process of inputting safety response information.

In preparation for safety confirmation, individual data and safety confirmation item through which the safety information is exchanged are previously registered. FIG. 10 shows an example of contents registered as individual data displayed on the browser of personal computer and the image plane of the cell phone inputted from the cell phone. The individual data to be registered includes an individual ID, a password, name, company name, 6 emergency information addressees in order of priority, setting of result report, report type, phone number of the person which receives the report, mail address of the person which receives the report conditions of result report or the like. The safety confirmation item can be set. The safety confirmation item is shown in FIG. 7. An original inquiry item and at most 10 answers to the original inquiry item can be prepared previously. Also 6 emergency information addressees and the safety confirmation item can be inputted from the cell phone. A plurality of persons can be registered as information addressees in a group. In the case, a group ID can be set. Furthermore, as message contents, a set of information addressees and message can be registered in a format.

The safety confirmation using the safety confirmation system 30 will be explained with reference to FIGS. 7 to 9.

Message media includes (1) voice by general telephone or PHS or Personal Handyphone System and (2) E-mail by communication terminals provided with mail function such as personal computer or cell phone with i-mode.

Firstly, the company, the disaster countermeasures office, families or the like transmits safety confirmation information to the safety confirmation system 30 by voice by phone, cell phone mail, or personal computer mail.

Since the procedures in transmitting the safety confirmation information to the safety confirmation system by voices by phone is similar to that of flowchart shown in FIG. 5, its explanation will be omitted.

When the safety confirmation information is transmitted to the safety confirmation system 30, the safety confirmation information is sent to the designated receivers.

Furthermore, the media which are used for receiving communications can be a beeper or a facsimile in addition to general phone, cell phone, PHS, communication terminal with mail function. Since in this case the process of confirming information contents is similar to that of the above-mentioned emergency connection system, its explanation will be omitted.

The company members, disaster victims, person in charge on job site or the like who receive the safety confirmation information transmit the safety response information to the safety confirmation system 30.

Figure 8:
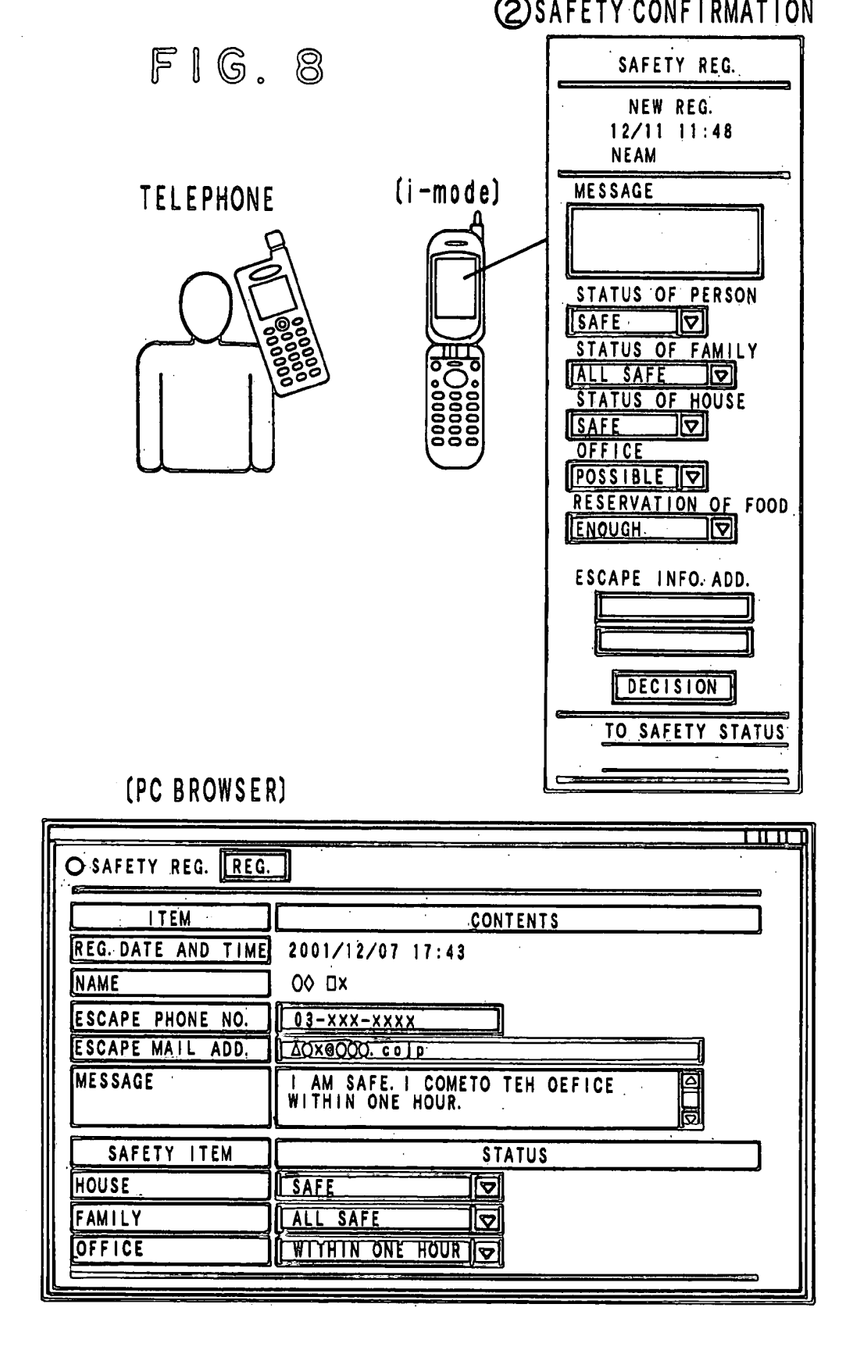
FIG. 8 shows an image plane of cell phone in case that a safety response information is transmitted to a safety confirmation system by the cell phone provided with mail function, and a personal computer browser in case that a safety response information is transmitted to a safety confirmation system by user personal computer.

FIG. 7 shows a process of inputting safety response information, and FIG. 8 shows an image plane of cell phone in case that a safety response information is transmitted to a safety confirmation system by the cell phone provided with mail function, and a personal computer browser in case that a safety response information is transmitted to a safety confirmation system by user personal computer.

The company members or families can register the safety response information to the safety confirmation system 30 before they receive the safety confirmation information. In that case, when the safety response information is transmitted by phone, they call the safety confirmation system 30 and answer by push operations in accordance with guidance to transmit the safety response information to the safety confirmation system 30. Then, the safety response information is registered.

In case that the safety response information is transmitted to the safety confirmation system 30 by the personal computers or the cell phones provided with mail, the safety response information is transmitted to the safety confirmation system 30 by access using the browser of the personal computer or the cell phone provided with mail function. Then, the safety response information is registered.

In case of transmission by the cell phone with mail function as shown in FIG. 8, person status, family status, house status, status as to whether company member come to office, reservation of food, information addressee of evacuation or escape place and the like are inputted and then is transmitted.

In case of transmission the safety items of phone number of information addressee of evacuation place, mail address of information addressee of evacuation place, message, house, family, status as to whether company member come to office and the like are inputted and then is transmitted.

Next, the procedures in which a client, that is, company, disaster countermeasures office, company members, families and the like obtains the transmission result after the safety response information is transmitted to the safety confirmation system 30 will be explained.

Since the safety response information by the phone is received into the safety confirmation system 30 and then is accumulated in the safety response information registration section 38, when the client wants to enquire the safety response information he calls up to the safety confirmation system 30 and selects by push operations the contents which he desires to listen to.

Figure 9:
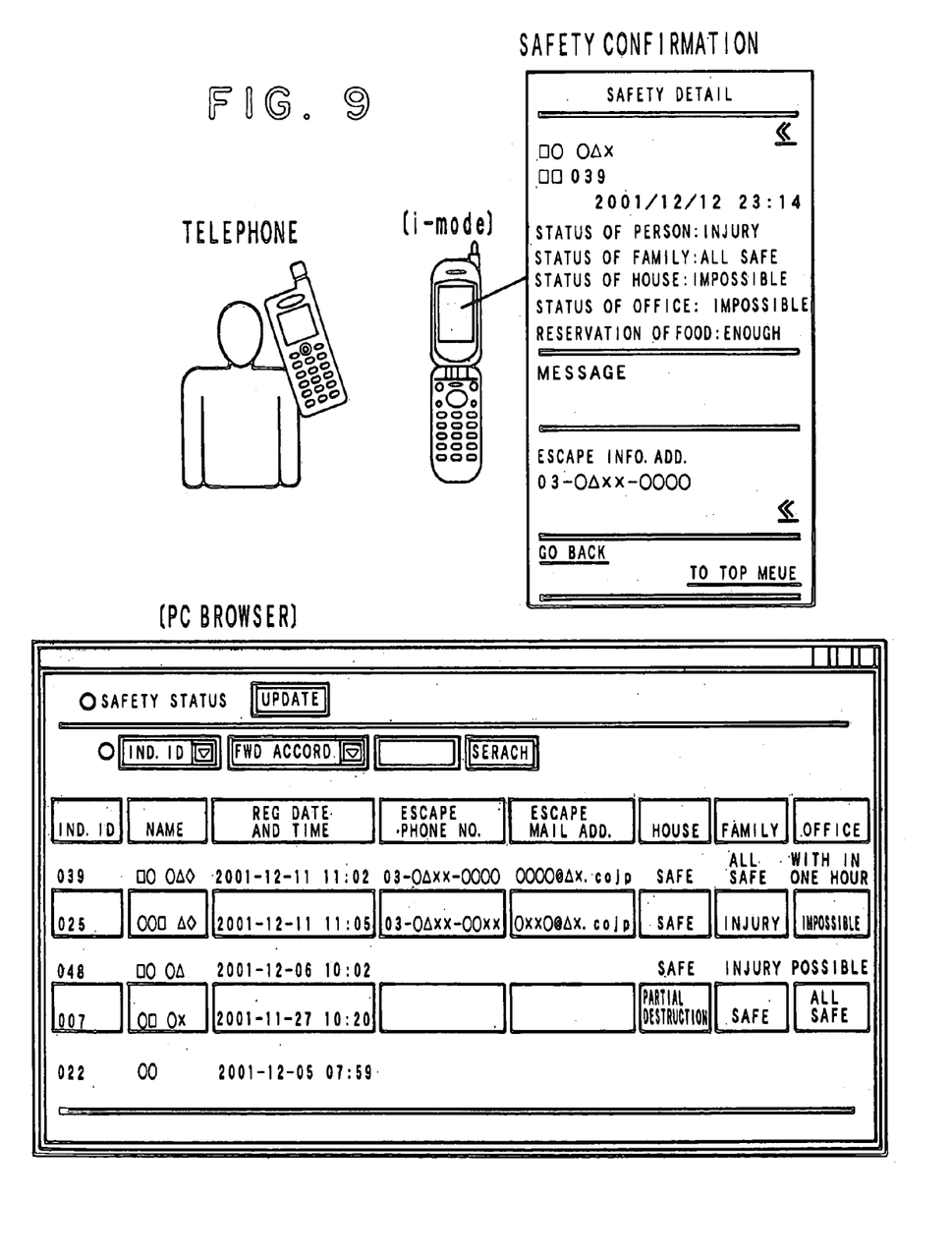
FIG. 9 shows an image plane of cell phone in case that a safety response information is obtained by the client cell phone provided with mail function, and a personal computer browser in case that a safety response information is obtained by client personal computer.

FIG. 9 shows an image plane of cell phone in case that a safety response information is obtained by the client cell phone provided with mail function, and a personal computer browser in case that a safety response information is obtained by client personal computer. The safety status is displayed on the browser in a real time.

On the image plane of cell phone, the status of individual, family and house, status as to whether the company members come to the office, the reservation of food, message, evacuation information addressee are displayed.

On the browser of personal computer, individual ID, name, date and hour on which the safety is registered, phone number of evacuation information addressee, mail address of information addressee, the status of family and house, status as to whether the company members come to the office, and the like are displayed.

Furthermore, in case that the safety confirmation item and the safety response information are registered in voices, voice information is accumulated in the safety information accumulation section 32 and in case that the receivers are mail communication terminals or FAX, the contents "there is a voice message" included in the document is attached.

In case that the safety confirmation item and the safety response information are registered in characters, the information format can be converted into voice at the conversion section 14 and then information is transmitted by the voice signals. That is, the character data is converted into a robot voice in combination of sounds by "text to speech" at the conversion and then voice signals are transmitted. Since there is an application provided through firmware on voice processing board in the safety confirmation system 30, the conversion between the voice and characters or images can be made.

Furthermore, the registration of safety confirmation item and the registration of safety response information to the safety confirmation system 30 may be composed of either one of voice, image and characters. Therefore, the information from the plurality of user communication terminals or the information to the plurality of user communication terminals may be in combination of voice and image, image and characters, voice and characters, or voice, image and characters.

Now family safety message system will be explained in detail. Basically the family safety message system is similar to that of safety confirmation system 30, but is different in that the safety confirmation item and safety response information are registered in a format of message registration and message can be reproduced in voices. Although the system construction is basically similar to that of the safety confirmation system 30, it is different in that message registration accumulation section is used in place of the safety information accumulation section 32, and the statistical data creation section 34 is not used.

The media which can register the message includes (1) voice by general telephone or PHS or Personal Handyphone System and (2) E-mail by communication terminals provided with mail function such as personal computer or cell phone with i-mode. This is similar to that of the safety confirmation system 30.

The media which are used for receiving communications can be a beeper or a facsimile in addition to general phone, cell phone, PHS, communication terminal with mail function. In that case, since the procedures which confirms the contents of the message is similar to that of emergency connection system, its explanation will be omitted.

Furthermore, in case that the registration of the message in family safety message system 40 is made by voices, voice information is accumulated in the message information accumulation section and in case that the receivers are mail communication terminals or FAX, on transmitting, the contents "there is a voice message" included in the document is attached.

In case that the registration of message is character information, the character data is converted into a robot voice at the "text to speech" of the conversion section 14 and can be broadcast or communicated all at once in voice signals. Since there is an application provided through firmware on voice processing board in the emergency connection system 2, the conversion between the voice and characters or images can be made.

Furthermore, the registration of message in the family safety message system 40 may be made by either one of voice, image and characters and the broadcast may be either one of voice, image and characters. Therefore, the registration of messages from the user communication terminals or the transmission to the user communication terminals may be in combination of voice and image, image and characters, voice and characters, or voice, image and characters.

What we claim:

1. An emergency communication system connected to a plurality of user communication terminals through public lines which comprises:

a receiver and transmitter section for receiving information from a plurality of user communication terminals and for transmitting information to a plurality of user communication terminals, an ID memory section for storing ID of each user, an ID confirmation section for confirming user ID by reference to ID data stored in said ID memory section when information is received from the each user communication terminal and permitting receipt of the information from the user in case that the received ID is compatible with the stored ID, an information accumulation section for accumulating information received from user in case that said ID confirmation section permits receipt, and an information addressee registration section for registering at least one addressees to which the information accumulated in said information accumulation section is communicated through public lines, in which when said receiver and transmitter receives an emergency information from user communication terminals said information is accumulated in said information accumulation section and the information thus accumulated is transmitted all at once to the information addressees registered in said information addressee registration section.

2. An emergency communication system according to claim 1 which further comprises a conversion section for converting information of character signals accumulated in said information accumulation section to voice signals in case that information of character signals is received from user communication terminals.

3. An emergency communication system according to claim 1 in which the information from said plurality of user communication terminals and the information to said plurality of user communication terminals are a combination of at least voice, image or character.

4. An emergency communication system connected to a plurality of user communication terminals through public lines which comprises:
- a receiver and transmitter section for receiving information from a plurality of user communication terminals and for transmitting information to a plurality of user communication terminals,
- an ID memory section for storing ID of each user,
- an ID confirmation section for confirming user ID by reference to ID data stored in said ID memory section when information is received from the each user communication terminal and permitting receipt of the information from the user in case that the received ID is compatible with the stored ID,
- a safety confirmation item registration section for accumulating information of safety confirmation item received from user communication terminals in case that said ID confirmation section permits receipt, and
- a safety response information registration section for registering the safety response information when said ID confirmation section permits receipt of the safety response information in said safety confirmation item from user communication terminals which received the safety conformation information including said safety confirmation item, in which in case that an enquiry information is received from the communication terminal of user who wants to obtain the safety response information registered in said safety response information registration section, on condition that the user ID is compatible, said enquiry information is registered in said safety response information registration section and the safety response information corresponding to said enquiry information is provided to user communication terminal.

5. An emergency communication system according to claim 4 which further comprises a statistical data creation section for creating statistical data from said safety response information.

6. An emergency communication system according to claim 4 in which the information from said plurality of user communication terminals and the information to said plurality of user communication terminals are a combination of at least voice, image or character.

* * * * *